O. B. LATHAM.
Packer for Oil-Wells.
No. 8,785. Reissued July 1, 1879.
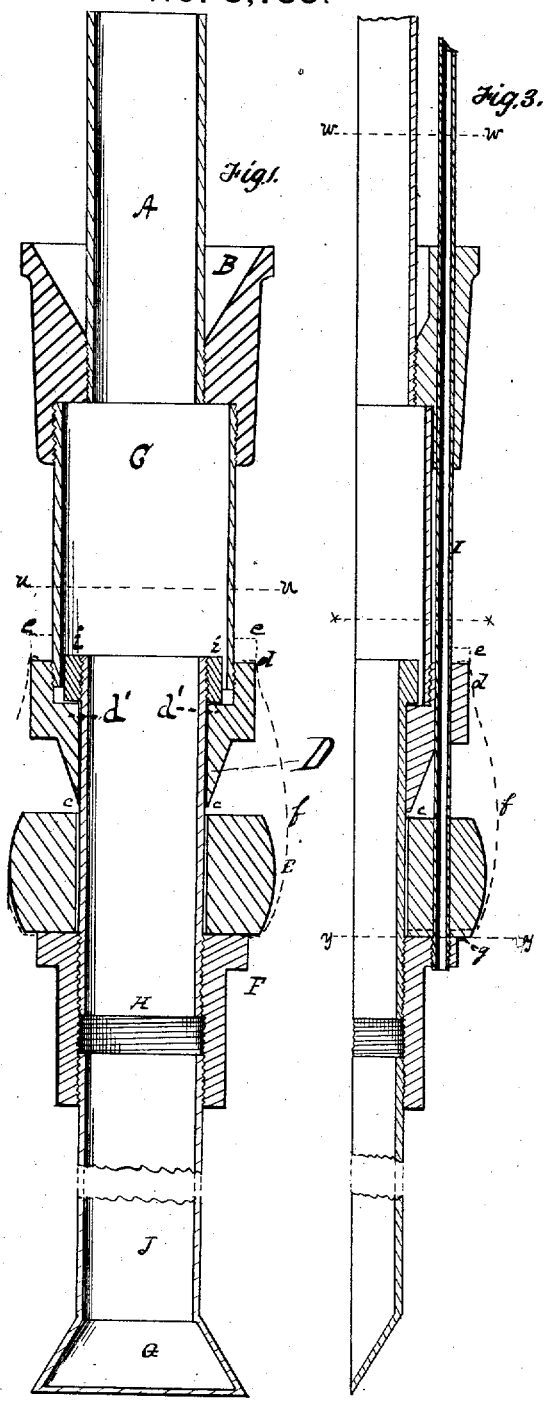
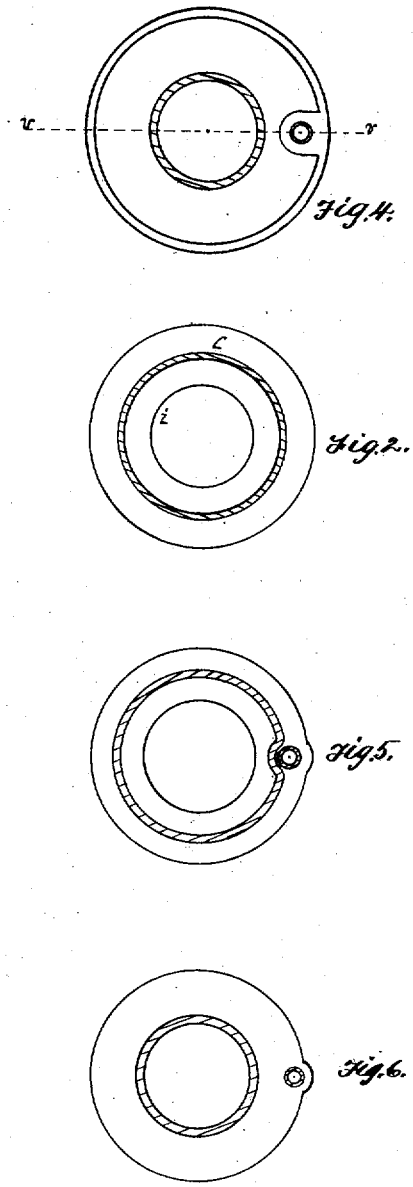
Witnesses
F. S. Evans
E. W. B. Phillips
Inventor
Obadiah B. Latham
by Bakewell & Kerr
Attorneys
N. PETERS, PHOTO-LITHOGRAPHER, WASHINGTON, D. C.

UNITED STATES PATENT OFFICE.

OBADIAH B. LATHAM, OF SENECA FALLS, NEW YORK.

IMPROVEMENT IN PACKERS FOR OIL-WELLS.

Specification forming part of Letters Patent No. 56,234, dated July 10, 1866; Reissue No. 8,574, dated February 11, 1879; Reissue No. 8,785, dated July 1, 1879; application filed February 17, 1879.

*To all whom it may concern:*

Be it known that I, OBADIAH B. LATHAM, of Seneca Falls, in the county of Seneca and State of New York, have invented a new and useful Improvement in Packers for Oil-Wells; and I do hereby declare the following to be a full, clear, and exact description thereof, reference being had to the accompanying drawings, making part of this specification, in which—

Figure 1 is a vertical section. Fig. 2 is a transverse section through the line *u u*, Fig. 1. Fig. 3 is a vertical section through the line *v v*, Fig. 4. Fig. 4 is a transverse section through line *w w*, Fig. 3. Fig. 5 is a transverse section through line *x x*, Fig. 3; and Fig. 6 is a transverse section through line *y y*, Fig. 3.

Like letters of reference indicate like parts in each.

This invention relates to the construction of packers or devices for shutting off the water from the oil-bearing rock of oil-wells.

In the drawings, A indicates the pump-tube running down from the top of the well to the funnel-shaped socket B, into which it is screwed.

The use of the funnel-shaped socket is to check débris in its downward progress. The socket B is screwed upon the hollow cylinder C, which, in turn, is screwed into the flange *d* of the hollow truncated cone D, the lower edge, *e*, of which is made blunt to form a shoulder for the purpose of preventing the elastic packing E from sliding upon the cone while the apparatus is being lowered into the well.

Inside of the cylinder C is the collar *i* of the pump-tube H, which collar is firmly fastened to the tube H, has a free vertical movement in the tube C, and is retained in said tube C by the cone D, screwed thereon. The cylinder C and tube H form a continuation of the main pump-tube A.

The adjacent diameters of the cylinder C and collar *i* are slightly elliptical to prevent the collar from turning in the cylinder. At the lower end of the tube H is the anchor J, terminating with a chisel-edge, G, resting upon the bottom of the well.

The chisel G sustains the whole apparatus, and prevents any rotation of tube H, and likewise of the cylinder C, by means of the elliptical shape of said cylinder and of the collar *i*.

Mounted on and surrounding the tube H is an annulus or ring of gutta-percha or other elastic or flexible material. Its inner diameter is great enough to permit of its being slipped over the tube, and its outer diameter is a little less than that of the well, so that it may be raised and lowered freely therein, and yet be expanded against the walls. It is supported in any desired position by the flange F, which is screwed on the tube H.

The pump-cylinder (not shown in the drawings) is situated between the anchor-piece G and the pump-tube H, and it is not subject to change of position. Whenever it is desired to pack higher or lower in the well the distance between the pump and the packer is increased or diminished by lengths of pipe added to or taken from the tube H.

I is a pipe passing through the packer, which is sometimes used for carrying off gas confined below the packer. If it is desired to protect the rubber packer from the destructive action of the oil, it can be done by enveloping it by the sac *f*, which is made of leather, bladder, or other suitable material, and which is secured above between the flanges *d e*, and below between the flanges F and *g*, the flanges *e g* being screwed onto the cylinder H for that purpose. It is made water-tight, and when in use is filled with water. It subserves the double purpose of a packer and a protection to the packer E. It may be used as a packer where the walls of the well are irregular. It possesses peculiar advantages for this purpose. Its diameter can be increased suddenly by the pressure or weight of the tubing above, as hereinafter described, which forces it against the sides of the well and forms an immovable packing as long as the pressure continues. When it is required to change the location or withdraw the apparatus, it is quickly and easily elongated, and thus gotten out of the way by the upward pull.

The operation of my improvement is as follows: The parts being put together, as described, the whole apparatus is lowered into the well in the usual way. When the anchor comes in contact with the bottom of the well the tube H telescopes within the cylinder C, and the whole weight of the tubing above C comes down upon the elastic annulus, causing it to pack the well.

When the sac *f* is used it is expanded by the pressure of the tubing when the latter is telescoped, as described.

The part *d'* constitutes an annular internal projection at the lower end of the telescopic part of the device, the part *i* constituting a corresponding external annular projection on the upper end of the lower tubing section, these annular projections overlapping each other, whereby when the upper section of the tubing is withdrawn from the well it takes the lower section with it.

By raising the tubing and relieving the packer E of its pressure, the apparatus is freed and may be withdrawn from the well with ease.

If débris collects in the funnel B the tube A may be unscrewed and permit the débris to fall in the tube and be raised out of the well by drawing the tubing. The unscrewing of the tube A is made possible by the cylinder C, being prevented from turning by its elliptical shape and its connection with anchor, which, sunk in the bottom of the well, will not turn.

My invention makes a cheap, reliable, and easily-operated packer. It is not liable to get out of order, and if it does it is easy to get out of the well.

What I claim as my invention, and desire to secure by Letters Patent, is—

1. The combination of the pump-tube, a flexible or elastic packing loosely mounted upon and surrounding said tube, and a hollow conical wedge connected with the upper section of the tube and forced within the packing by the weight of the upper section of the tube, substantially as set forth.

2. An oil-well packer having a lower tube-section supported from below against downward pressure, a solid, thick, elastic annulus supported upon the lower tube-section against downward pressure, an upper tube-section carrying a device which presses the annulus against the wall of the well, and telescopic joint connecting the tube-sections, and provided with interior annular projections which engage with each other and withdraw the lower tube-section and annulus when the tubing is removed from the well, substantially as set forth.

3. A pump-tube made in sections having a telescopic movement on each other, in combination with a solid, thick, elastic ring or annulus, which receives and sustains the weight of the superincumbent tubing, substantially as and for the purposes set forth.

In witness whereof I, the said OBADIAH B. LATHAM, have hereunto set my hand.

OBADIAH B. LATHAM.

Witnesses:
J. M. EMORY,
T. B. KERR.